(12) United States Patent
Price et al.

(10) Patent No.: US 10,565,678 B2
(45) Date of Patent: Feb. 18, 2020

(54) ASYNCHRONOUS CAMERA FRAME ALLOCATION

(71) Applicant: MICROSOFT TECHNOLOGY LICENSING, LLC, Redmond, WA (US)

(72) Inventors: Raymond Kirk Price, Redmond, WA (US); Preetika Jain, Seattle, WA (US); Michael Bleyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 15/934,482

(22) Filed: Mar. 23, 2018

(65) Prior Publication Data

US 2019/0295213 A1   Sep. 26, 2019

(51) Int. Cl.
  *G06T 1/20* (2006.01)
  *G06T 19/00* (2011.01)
  *G06T 1/60* (2006.01)

(52) U.S. Cl.
  CPC .............. *G06T 1/60* (2013.01); *G06T 19/006* (2013.01); *G06T 2200/04* (2013.01); *G06T 2200/08* (2013.01); *G06T 2200/16* (2013.01); *G06T 2207/20004* (2013.01); *G06T 2207/20092* (2013.01)

(58) Field of Classification Search
  CPC .......... G06T 1/20; G06T 1/60; G06T 19/006; G06T 2200/04; G06T 2200/08; G06T 2200/16; G06T 2207/20004; G06T 2207/20092
  USPC ......................................... 345/7, 8, 418, 419
  See application file for complete search history.

(56) References Cited

U.S. PATENT DOCUMENTS

| 5,948,094 A | 9/1999 | Solomon et al. |
| 6,539,441 B1 * | 3/2003 | Dieckman ............. G06F 13/102 |
| | | 348/14.05 |

(Continued)

FOREIGN PATENT DOCUMENTS

| WO | 2017123395 A1 | 7/2017 |
| WO | 2017139871 A1 | 8/2017 |

OTHER PUBLICATIONS

"International Search Report and Written Opinion Issued in PCT Patent Application No. PCT/US2019/021958", dated Aug. 1, 2019, 19 Pages.

(Continued)

*Primary Examiner* — Jacinta M Crawford
(74) *Attorney, Agent, or Firm* — Workman Nydegger

(57) ABSTRACT

Optimizations are provided for asynchronously performing camera frame allocations in which camera frame requests are received from multiple image consuming components that each compete for use of one or more shared cameras to obtain one or more digital images of a surrounding environment. After receiving a batch of multiple camera frame requests, an arbiter pre-processes those requests by determining an execution order for each request in the batch. Once this execution order is established, then the arbiter sends those requests to a camera system for processing. Processing a request includes obtaining one or more digital images of the surrounding environment. In this manner, significant advantages are realized because the arbiter dynamically allocates the camera system's processing.

20 Claims, 13 Drawing Sheets

(56) References Cited

U.S. PATENT DOCUMENTS

| | | | | |
|---|---|---|---|---|
| 7,315,904 | B2* | 1/2008 | Geib | G06F 9/4881 709/224 |
| 8,599,265 | B2* | 12/2013 | Kim | G06K 9/00355 348/164 |
| 10,318,361 | B2* | 6/2019 | Fink | G06F 9/541 |
| 2010/0037267 | A1* | 2/2010 | Bennett | H04N 7/165 725/56 |
| 2010/0231754 | A1* | 9/2010 | Wang | H04N 5/76 348/231.99 |
| 2012/0023503 | A1* | 1/2012 | Trivi | G06F 9/526 718/104 |
| 2016/0378176 | A1* | 12/2016 | Shiu | G06F 3/011 345/633 |
| 2018/0080877 | A1* | 3/2018 | Hirawake | G01N 21/6456 |
| 2018/0082482 | A1 | 3/2018 | Motta et al. | |

OTHER PUBLICATIONS

"V4I2loopback—a Kernel Module to Create V4I2loopback Devices", Retrieved From: https://web.archive.org/web/20171226125144/https://github.com/umlaeute/v4I2loopback/, Dec. 26, 2017, 5 Pages.

* cited by examiner

ASYNCHRONOUS CAMERA FRAME ALLOCATION

BACKGROUND

Mixed-reality systems, including virtual-reality (VR) and augmented-reality (AR) systems, have received significant attention because of their ability to create truly unique experiences for their users. For reference, conventional VR systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all type of mixed-reality system, which (as detailed above) includes AR systems, VR reality systems, and/or any other similar system capable of displaying virtual objects.

The disclosed mixed-reality systems use one or more on-body devices (e.g., the HMD, a handheld device, etc.). The HMD provides a display that enables a user to view overlapping and/or integrated visual information (i.e. "virtual content") in whatever environment the user is in, be it a VR environment or an AR environment. To facilitate in providing this virtual content, the HMD often uses one or more cameras to obtain digital images of its surrounding environment. These images are used to perform at least head tracking, hand tracking, and/or depth detection. As a result, there are many different "image consuming components" (e.g., a head tracker, a hand tracker, and a depth detector, just to name a few) that compete for the cameras' processing.

Conventional HMDs use a very static scheduling mechanism in determining when an image consuming component will be able to use the cameras. Many traditional scheduling mechanisms, for example, outline exactly when each image consuming component will be granted access to the cameras' processing in order to avoid scheduling conflicts. Existing systems are also somewhat rigid and inflexible, in that they restrict the ability to update the static scheduling built into the systems. This is particularly problematic and effectively limits the flexibility and scalability of existing systems, such as when new image consuming components are introduced into the system.

The subject matter claimed herein is not limited to embodiments that solve any disadvantages or that operate only in environments such as those described above. Rather, this background is provided only to illustrate one exemplary technology area where some embodiments described herein may be practiced.

BRIEF SUMMARY

Disclosed embodiments are related to methods and systems for performing asynchronous camera frame allocation in an architecture where multiple image consuming components (e.g., a head tracker, a hand tracker, and a depth detector, and so forth) are mutually competing for the use of a camera system. In some embodiments, a separate processor performs the operations for each image consuming component while in other embodiments a single processor performs the operations of some or all of the image consuming components. These image consuming components submit camera frame requests according to their own predetermined frequency in order to use the camera system. Even though these predetermined frequencies can be different, there may be times when multiple requests from multiple different image consuming components are received at substantially the same time and in which the camera frame requests could interfere with one another.

To handle interfering camera frame requests, according to some embodiments, an arbiter is beneficially placed in the architecture to pre-process the interfering camera frame requests. As such, the arbiter acts as an interface between the camera system and the image consuming components. After receiving one or more camera frame requests, the arbiter dynamically determines when each of those requests will be processed irrespective of the predetermined frequencies in which the requests are generated by the requesting entities. The arbiter may, according to some embodiments, give priority to different requests in order to satisfy different needs and preferences. The arbiter may also impose a phase shift to the processing frequency of camera resource requests, handle multiple different requests simultaneously, or even selectively drop one or more requests. In this manner, it is possible to avoid some of the problems associated with rigid and static scheduling.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 also illustrates a table and a virtual object (i.e. a vase) that are visible to the user of the HMD.

FIG. 7 also shows how a request is delayed and how some of the predetermined frequencies are dynamically adjusted via a phase shift.

DETAILED DESCRIPTION

Figure 1:
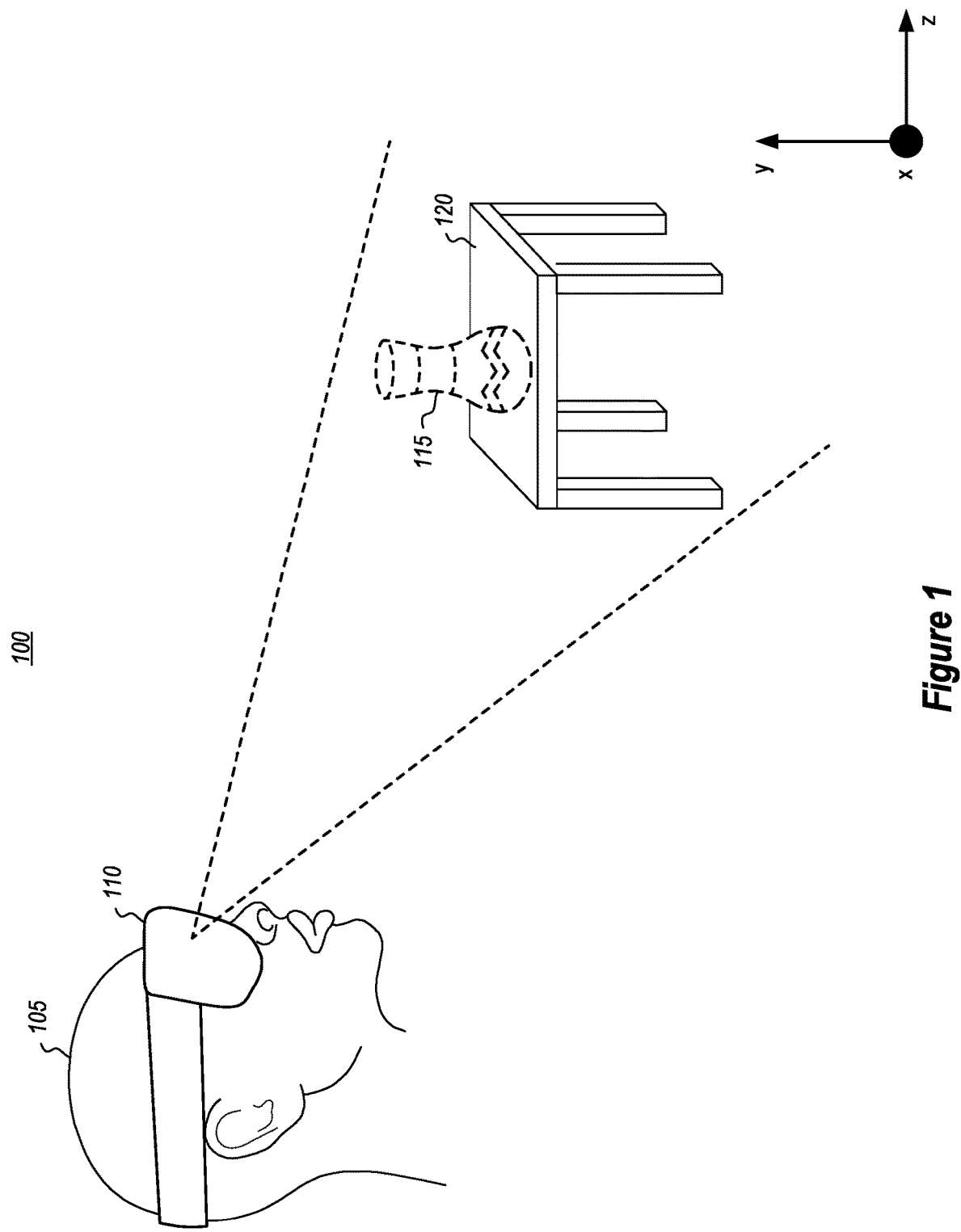
FIG. 1 shows a head-mounted device (HMD) structured to render virtual content, which may be dependent on information obtained from various different operations, including, but not limited to, head tracking operations, hand tracking operations, and/or depth detection operations, just to name a few.

Disclosed embodiments include methods and systems for dynamically apportioning camera resources in an architecture where multiple image consuming components (e.g., a head tracker, a hand tracker, a depth detector, etc.) are mutually competing for access to the camera and system processing resources.

In some embodiments, image consuming components submit "camera frame requests" (hereinafter simply "requests" or "request") in order to use the camera system (hereinafter "camera system" or "camera resources"). The camera requests are generated by each consuming component/entity at a corresponding frequency/schedule. Even though the frequencies may be different for each component, situations may arise where multiple requests are received at "substantially the same time," e.g., situations in which multiple requests are received prior to the camera system fully satisfying a previous one or more request(s) and/or instances where multiple requests are received concurrently and prior to the camera system processing any of those concurrent requests. The result of multiple requests being received at substantially the same time is that those multiple requests are considered "interfering" requests.

To handle interfering requests, an arbiter performs various "pre-processing" operations on the interfering requests, acting as an executive entity and by making the final determination as to when those requests will be processed.

In some instances, each individual image consuming component maintains its own frequency/schedule for issuing camera resource requests, even if this results in interfering requests. Then, the arbiter dynamically determines, on-demand, when those requests will be processed. In some instances, this dynamic flexibility is further accomplished by imposing a phase shift to a requesting entity's predetermined frequency, by handling multiple different requests simultaneously, or even by selectively dropping one or more requests. The arbiter may also delay the processing of a request, complete the processing of multiple requests simultaneously, or selectively drop certain requests from being processed. In this regard, the arbiter can avoid the rigid/static scheduling problems associated with many of the existing scheduling mechanisms.

It will be appreciated that the disclosed embodiments may be implemented to overcome many of the technical difficulties and computational expenses associated with allocating the use of a camera system among multiple requesting entities. For instance, in contrast to conventional systems that use statically defined and rigid camera frame rate/timing schedules, the disclosed embodiments enable the frame rates of multiple camera systems to be used in a highly dynamic, flexible, and robust manner. This is achieved by introducing an intelligent arbiter component that is capable of receiving and processing requests on-demand and without necessarily following a pre-determined schedule. By adopting this arbiter into the architecture, the disclosed embodiments can significantly improve the flexibility of the supported frame rates of the system, and can optimize the tradeoff between camera frame rate and system power consumption. Additionally, when using shared processors, this approach also allows for the optimization of the load on the processor. For instance, the disclosed embodiments provide an architecture capable of both receiving and responding to multiple, concurrent requests, which is something conventional systems that utilize pre-programed camera process scheduling cannot do.

Attention will now be directed to FIGS. 1 through 10, which present various environments, example scenarios, architectures, and other supporting illustrations for allocating camera system processing. Later, attention will be directed to FIGS. 10 through 12, which present exemplary methods and computer systems incorporating features of the claimed embodiments.

Head-Mounted Devices

FIG. 1 shows an example environment 100 where a user 105 is using a HMD 110. The HMD 110 is an example of a mixed-reality system that is able to render virtual content for the user 105. The HMD 110 may be a VR or an AR system, such that environment 100 may be a VR environment or an AR environment. The terms environment, mixed-reality environment, and surrounding environment will be used interchangeably herein to refer to environment 100 and other HMD environments referenced herein.

To make the mixed-reality environment as realistic as possible, the HMD 110 often performs head tracking to ensure that the mixed-reality environment is properly oriented in relation to the user 105's perspective. Additionally, the HMD 110 often performs hand tracking to gauge how the user 105 is interacting with the mixed-reality environment.

Similarly, the HMD 110 also performs depth detection to ensure that virtual content is projected in a realistic manner so as to naturally interact with the surrounding environment. In this manner, the HMD 110 performs head tracking, hand tracking, and depth detection to ensure that the mixed-reality environment, which in this situation includes a virtual vase 115 and a real table 120, is as realistic as possible.

Figure 2:
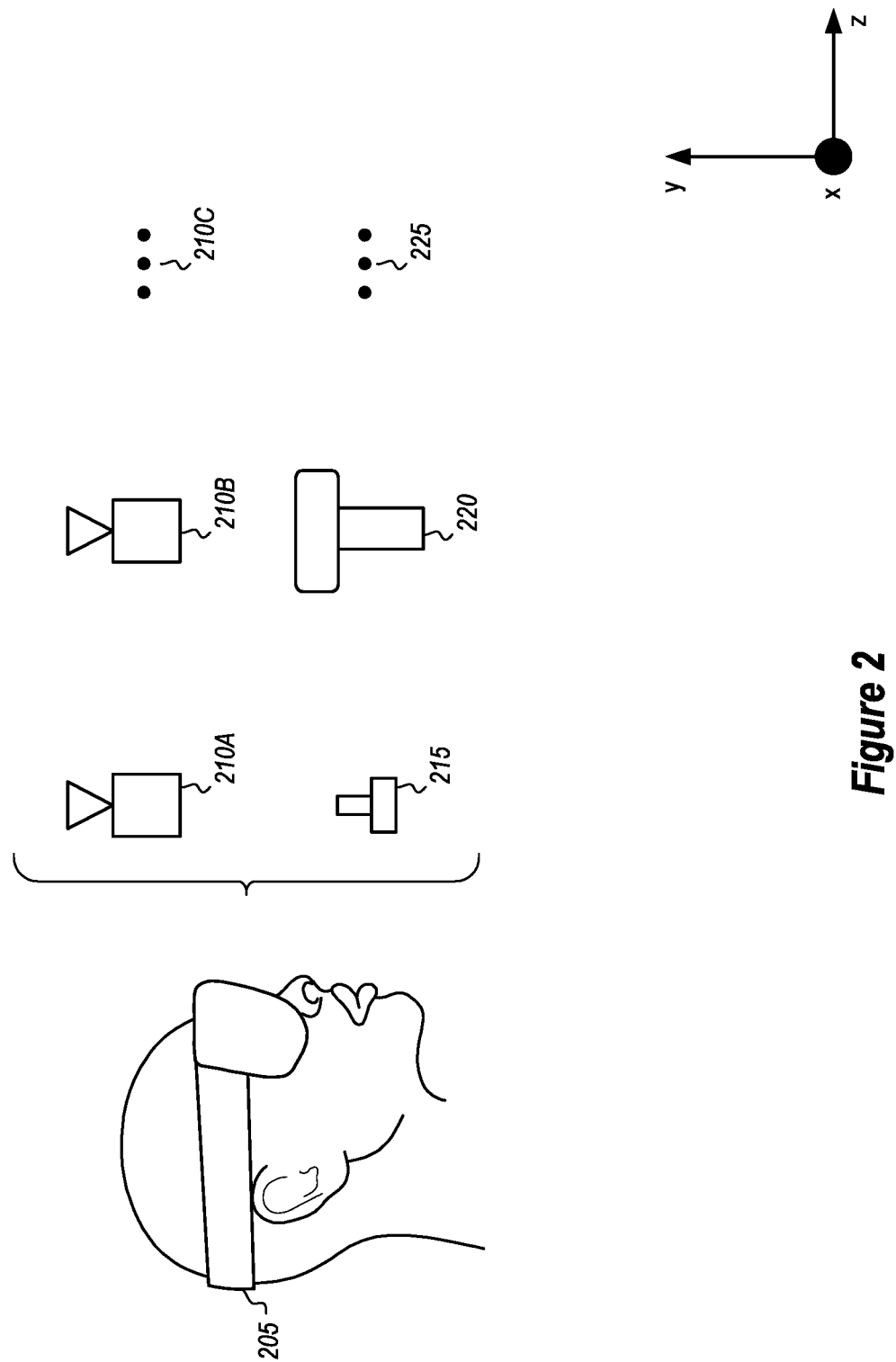
FIG. 2 shows that the HMD includes different hardware components such as, for example, one or more cameras, infrared (IR) dot-pattern illuminators, and/or flood IR illuminators.

To perform these operations, the HMD 110 includes various different hardware components. For example, FIG. 2 shows that HMD 205, which is an example of HMD 110 from FIG. 1, includes a camera system comprising any number of cameras (e.g., camera 210A, camera 210B, and the ellipsis 210C demonstrates that HMD 205 is able to support any number of other cameras). The camera system is configured to obtain a camera frame (e.g., a digital image) that captures photons for both the visible light spectrum and the infrared (IR) light spectrum.

HMD 205 also includes one or more IR dot-pattern illuminator(s) 215. The IR dot-pattern illuminator 215 is used to add "texture" to an object in the environment, especially when that object has a smooth (e.g., relatively textureless) surface. This added texture is in the form of IR light that is projected according to a pre-selected dot pattern. By projecting a dot pattern of IR light onto a smooth surface (i.e. by adding texture), the HMD 205 is able to determine a depth for that textureless/smooth surface by performing stereo matching using any reflected IR dot-pattern light.

The HMD 205 also includes one or more IR flood illuminator(s) 220. The IR flood illuminator 220 is used to project a homogeneous flood of IR light into the surrounding environment. Such an operation is particularly beneficial in low visible light environments. For instance, while a low visible light environment might not have enough visible light to perform head and hand tracking, the HMD 205 is still able to perform those operations by instead using the flood of reflected IR light to augment, or replace, the visible light with the IR light. The ellipsis 225 demonstrates that the HMD 205 may include other hardware components as well.

Figure 3:
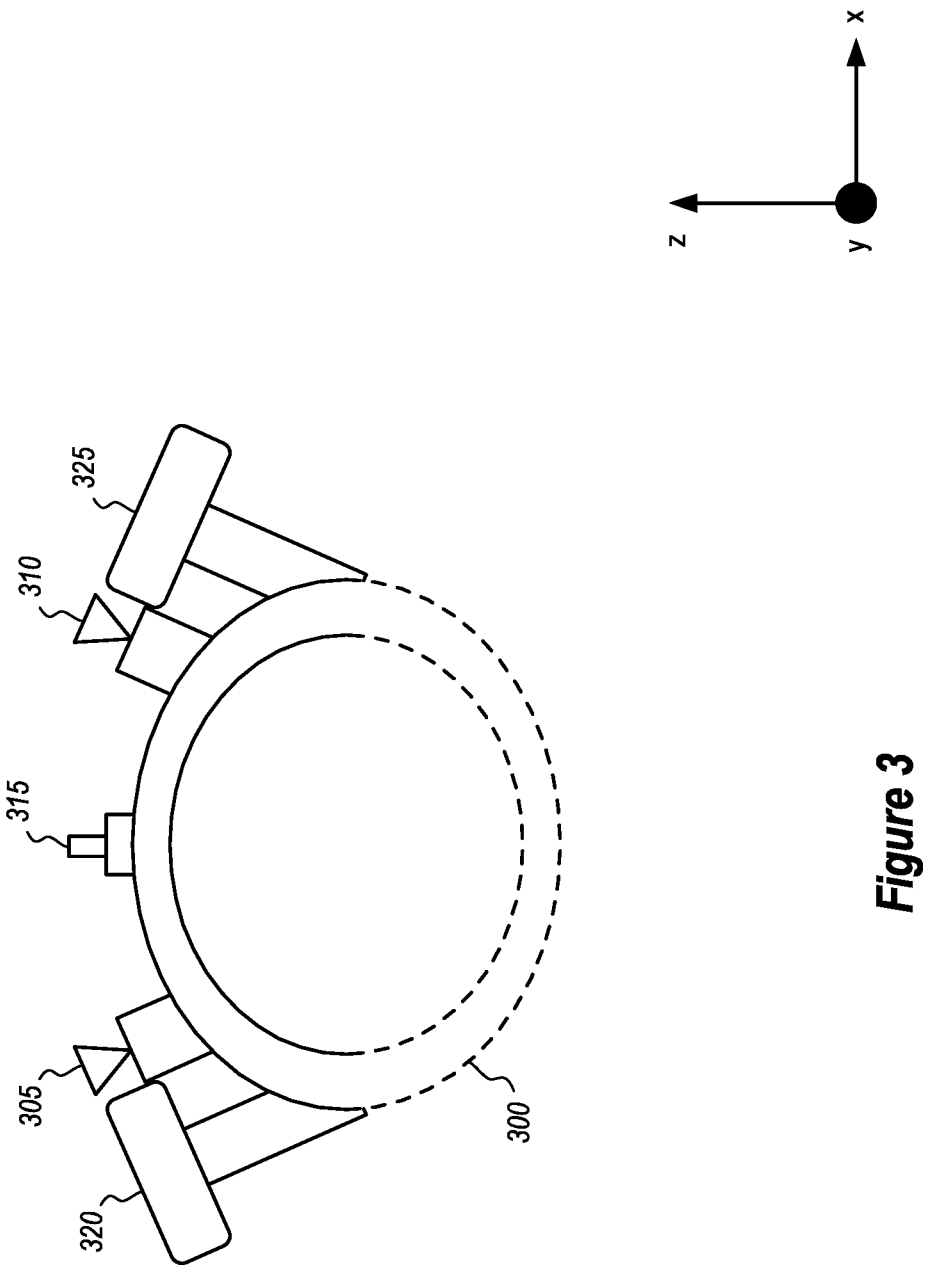
FIG. 3 provides an example configuration of how the one or more cameras, IR dot-pattern illuminators, and/or flood IR illuminators may be mounted on a HMD.

These hardware features may be mounted on a HMD in various different manners. FIG. 3 shows one example scenario of how the hardware components may be mounted on HMD 300, which is an example of HMD 205 from FIG. 2. In particular, HMD 300 includes at least two cameras 305 and 310, at least one IR dot-pattern illuminator 315, and at least one flood IR illuminator (though two flood IR illuminators 320 and 325 are shown).

The IR dot-pattern illuminator 315 is mounted on the HMD 300 so that its IR dot-pattern projection will be simultaneously sensed by both cameras 305 and 310. Therefore, when the HMD 300's depth detector, which is a type of image consuming component, performs stereo matching to determine depth, the depth detector is able to factor in the added texture that was sensed by both of the cameras 305 and 310.

The flood IR illuminator 320 is mounted proximately to camera 305, and the flood IR illuminator 325 is mounted proximately to camera 310. These positions are selected so that at least some, and preferably a majority, of the cameras 305 and 310's fields of view are illuminated by floods of IR light emitted by the flood IR illuminators 320 and 325, respectively. Therefore, when a head tracker and/or hand tracker, which are types of image consuming components, perform their respective tracking operations, those trackers are able to factor in the added IR light to improve their respective tracking operations. As a reference, the head tracker is able to determine a pose estimation for the HMD, the hand tracker is able to track a position of a user's hand, and the depth detector is able to determine depth using active or passive stereo images.

Figure 4:
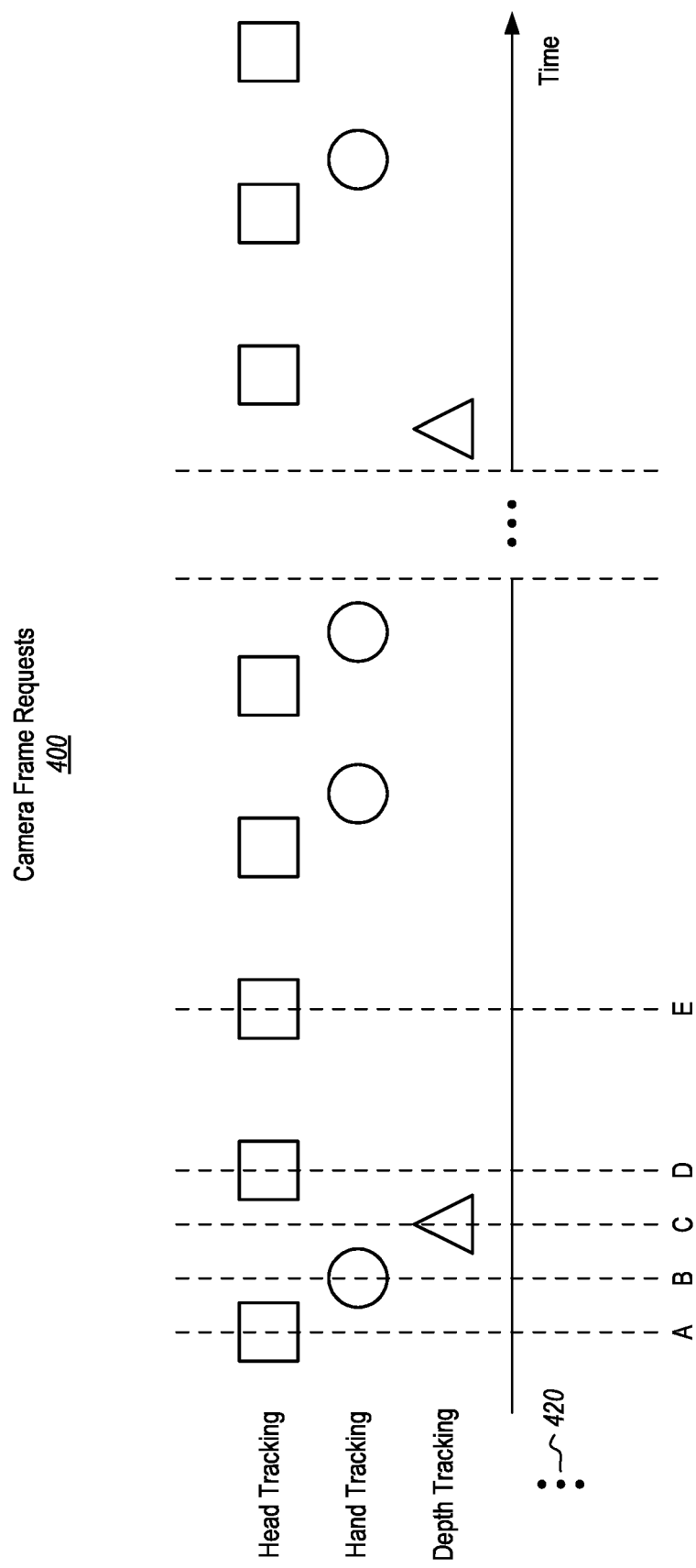
FIG. 4 shows a traditional static scheduling mechanism in which camera frame requests were all statically scheduled in a rigid, inflexible manner.

FIG. 4 shows an example of how conventional HMDs statically schedule when their image consuming components will submit requests 400. As shown, there are at least three different image consuming components, namely, a head tracking component (hereinafter a head tracker), a hand tracking component (hand tracker), and a depth tracking component (depth detector). The ellipsis 420 demonstrates that other components may also be present. Additionally, alternate modalities for the same camera are also available (e.g., long throw implementations and/or short throw implementations).

The square elements correspond to requests submitted by the head tracker while the circle and triangle elements correspond to requests submitted by the hand tracker and the depth detector, respectively. In conventional systems, these requests are submitted in accordance with a static schedule that imposed a fixed scheduling scheme with regard to when requests are submitted. For example, static scheduling mechanisms allow only a predetermined frame rate. Each of these scheduling permutations has a predetermined timing, and each is defined as an allowed operational state. For example, at time "A," the head tracker submits a request, at time "B" the hand tracker submits a request, at time "C" the depth detector submits a request, and then at times "D" and "E" the head tracker again submits requests. According to traditional techniques, other frame rates are not scheduled as there would be too many states to pre-program and pre-determine. Such a scheduling scheme is static, and does not allow the frame rate to be tailored to the experience, or optimized for power (particularly when new image consuming components are added). As a result, conventional systems fail to provide an optimal solution in allocating camera processing when obtaining camera frames for image consuming components.

Example Architecture for Efficiently Allocating Camera Processing

Figure 5:
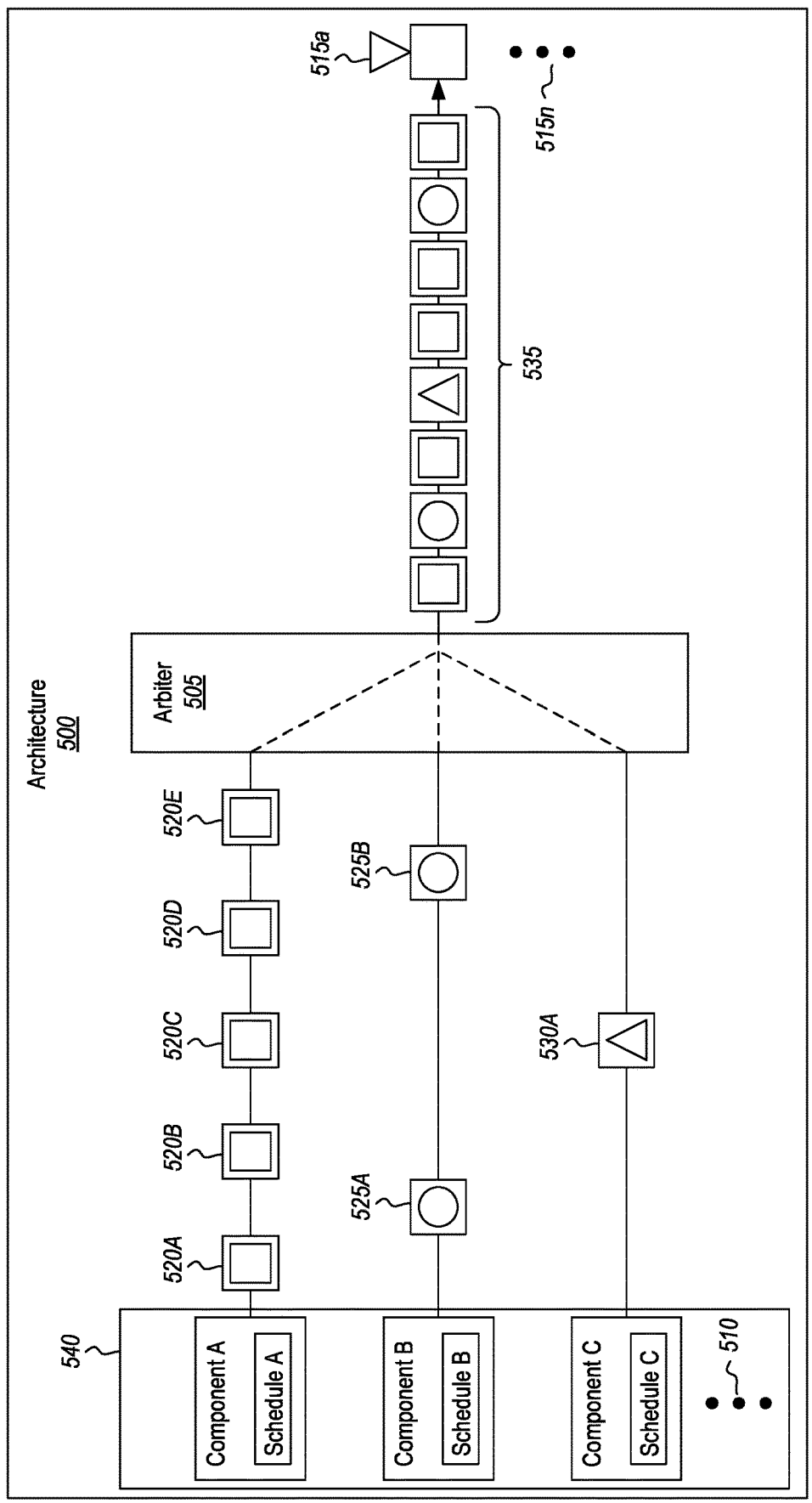
FIG. 5 illustrates an example architecture that asynchronously, flexibly, and dynamically allocates a camera system's processing among multiple, mutually competing image consuming components (e.g., a head tracker, a hand tracker, and a depth detector, just to name a few).

FIG. 5 shows an example architecture 500 that may be included in a HMD (e.g., the HMD 300 from FIG. 3). This architecture 500 facilitates the dynamic allocation of a camera system's frame rates and associated image processing so that multiple image consuming components are able to use this shared resource while still enabling the architecture 500 to be highly scalable. This is achieved, at least in part, because the camera system can support high frame rates (e.g., greater than 60 Hz). As shown, architecture 500 includes an arbiter 505 and multiple different image consuming components. These image consuming components include Component A (e.g., a head tracker), Component B (e.g., a hand tracker), and Component C (e.g., a depth detector). As discussed earlier, components A, B, and/or C may operate using the same cameras but in different modalities, or components A, B, and/or C may operate using different cameras that interfere with one another or that are processed by the same hardware logic unit. The ellipses 510 demonstrates that additional or fewer image consuming components may be added or removed from the architecture 500 at any time and for any reason.

Component A independently maintains its own frequency schedule (e.g., Schedule A) for submitting requests. Similarly, Component B independently maintains its own frequency schedule (e.g., Schedule B), and Component C also independently maintains its own frequency schedule (e.g., Schedule C). In some embodiments, the user experience, application, and/or processor load may impact the camera's frame rate. According to the disclosed principles, these image consuming components now submit their requests to the arbiter 505 instead of directly to any of the cameras (e.g., camera 515a up to an including camera 515n), according to their own frequency schedules. In some embodiments, the image consuming components are configured to submit their requests directly to the cameras 515a-n, but the arbiter 505 intercepts those requests. Once those requests are obtained, the arbiter 505 performs various different pre-processing operations on those requests, these pre-processing operations will be discussed later in connection with FIGS. 6B, 7, 8, and 9. While FIG. 5 shows the cameras 515a-n, it will be appreciated that the architecture 500 may include any number of cameras or differing types of cameras, and the arbiter 505 is able to interact with those cameras.

As shown, Component A is submitting requests 520A, 520B, 520C, 520D, and 520E according to the frequency maintained in Schedule A. Similarly, Component B is submitting requests 525A and 525B according to the frequency maintained by Schedule B, and Component C is submitting the request 530A in a similar manner.

After the arbiter 505 performs its pre-processing (which will be discussed later), the camera 515 processes those requests by obtaining one or more digital images. In some embodiments, the cameras 515a-n may directly return those images to the requesting entity (e.g., Component A) while in other embodiments the cameras 515a-n may return the images to the arbiter 505 which will then deliver the images to the requesting entity, as shown in FIG. 6A.

As shown in FIG. 5, the components A, B, and/or C may be a part of a system application 540 such that the requests are coming from the system application 540. Therefore, in some embodiments, the arbiter 505 intercepts the requests from the system application 540 to provide real-time scheduling of the camera frames. As such, in some implementations, the components A, B, and/or C submits requests while in other implementations a system (e.g., system application 540) that is in communication with the components and/or that incorporates the components issues the requests, which the arbiter 505 receives. Thereafter, the cameras 515a-n expose/provide the requested frames and the system responsively processes/consumes the resulting/received frames.

Figure 6A:
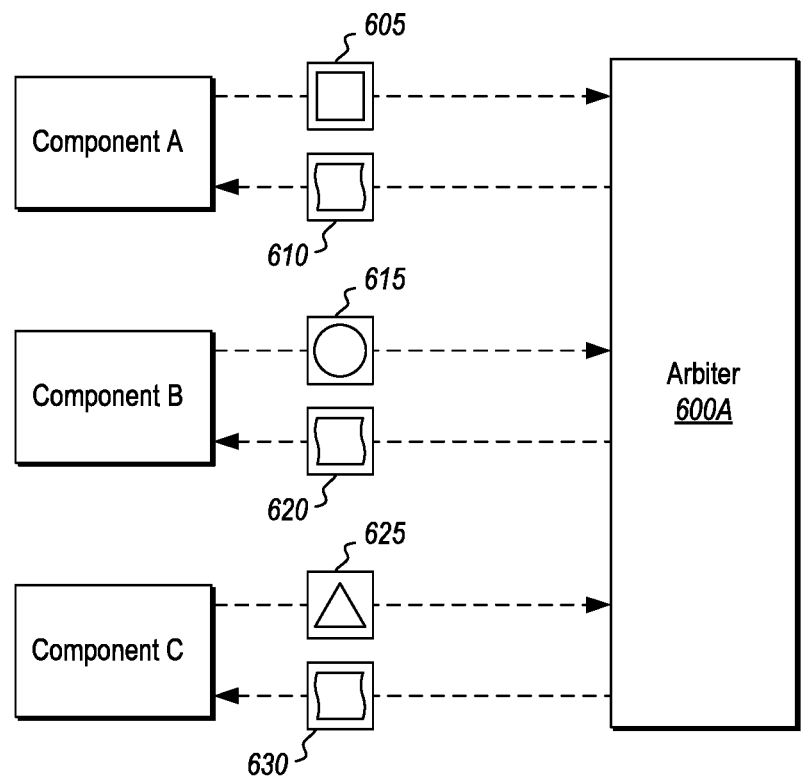
FIG. 6A shows how an arbiter is able to communicate with any number of image consuming components to facilitate the processing of camera frame requests by a shared camera system or shared processing component.

In particular, FIG. 6A shows an arbiter 600A, which is an example of the arbiter 505 from FIG. 5 and which is receiving requests from the different image consuming components. After pre-processing those requests, the arbiter 600A submits them to the camera system. After the camera system fulfills each request by obtaining one or more digital images, those images are routed back (in this embodiment) to the arbiter 600A. The arbiter 600A then delivers those images back to the requesting entity. In some alternative configurations, the requested images are routed directly to the consuming components, bypassing the arbiter.

FIG. 6A illustrates an example in which Component A submits a request 605 to the arbiter 600A which then submits that request to the camera system. The arbiter 600A later receives images from the camera system and then delivers those images (now images 610) back to Component A. Similar operations are shown for Component B (e.g., see request 615 and images 620) and Component C (e.g., see request 625 and images 630).

It will be appreciated that the arbiter acts as a middleman when it receives and pre-processes requests before submitting those requests to the camera system. With that said, the disclosure will now focus on how the arbiter "pre-processes" requests.

Pre-Processing Requests

When requests are received, one at a time and with sufficient time in between each request (such that each request can be fully processed before another request is received), the arbiter (e.g., the arbiter 505 from FIG. 5 or the arbiters 600A from FIG. 6A) can simply pass those requests immediately to the camera system for processing and then return the digital images to the requesting entity. Such a scenario does not create any conflicts or interference and is easily handled. However, as more image consuming components are added to the system, or even as the existing image consuming components begin to submit requests more frequently, conflicting conditions and interfering requests will likely occur, as described below.

For instance, even though the image consuming components may submit requests at different predetermined frequencies, there may be times when multiple requests (i.e. a batch) from multiple different image consuming components are received at "substantially the same time," which was defined earlier. Such situations cause the requests to interfere or collide with one another. The arbiter is able to dynamically respond to such interfering conditions by pre-processing the batch of requests.

One way in which the arbiter pre-processes requests is by establishing an execution order for those requests. In some embodiments, the arbiter establishes an execution order by following a simple first-in-first-out (FIFO) approach. In this manner, the arbiter acts like a FIFO queue and sends each request to the camera system based on the order in which each request was received.

In some embodiments, the arbiter establishes an execution order by following a more sophisticated approach. For instance, the arbiter is able to weigh various parameters, which may be included in each request or which may be independently ascertained by the arbiter itself, and to determine which request is to be executed first, second, third, and so on using those parameters. As an example, the arbiter may determine that, based on the parameters associated with each request in a batch, one particular request is to be prioritized (and thus executed first) over another request. Some of these parameters are shown in FIG. 6B which shows an arbiter 600B that is an example implementation of the arbiter 505 from FIG. 5.

Figure 6B:
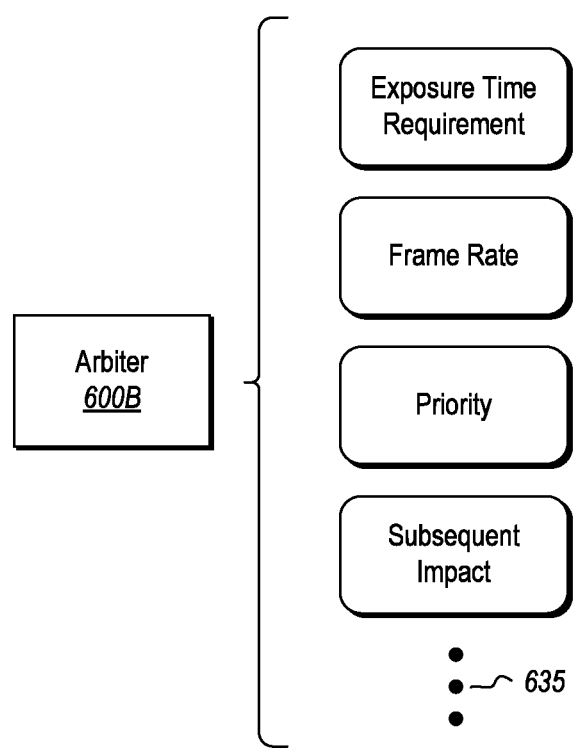
FIG. 6B shows some of the factors/parameters that the arbiter considers when it dynamically decides how to allocate the camera system's processing among multiple image consuming components, each of which may simultaneously request processing cycles from the camera system.

FIG. 6B shows four separate parameters that the arbiter 600B considers when establishing an execution order for a batch of requests. Although only four parameters are shown, the ellipsis 635 demonstrates that the arbiter 600B may also consider additional (or fewer) parameters.

In some embodiments, one, some, or all of these parameters are included in each request such that each requesting image consuming component determines these parameters and then passes them to the arbiter 600B. In other embodiments, one, some, or all of these parameters are independently determined by the arbiter 600B by collecting and synthesizing information obtained from its HMD.

One of the parameters is an exposure time requirement that indicates how long the camera system (e.g., cameras 515a-n from FIG. 5) should collect photons. Because environments change, enabling the camera system to support a "variable" exposure time may result in a better image. As used herein, a "variable" exposure time means that the camera system is able to dynamically adjust how long it will sense photons (either visible light or IR light photons) based, at least partially, on the current environmental conditions.

By way of example, visible light photons are relatively scarce in a low visible light environment, such that increasing the camera system's exposure time will enable the camera system to sense more photons, thus potentially producing a higher quality image. In contrast, because visible light photons are abundant in a brightly lit environment, the camera system may use a reduced exposure time. It follows then that exposure time requirements are generally associated with an image "quality" metric. It also follows that requests which are associated with a prolonged exposure time requirement will necessarily take longer to complete than requests that do not have a prolonged exposure time requirement.

In this manner, one request may require that the camera system use a particular exposure time while another request may include a completely different exposure time requirement. As such, the arbiter 600B considers not only image quality aspects related to an exposure time requirement, but it also considers a timing aspect when factoring/considering this particular parameter.

Another parameter is a frame rate which corresponds to the frequency that the image consuming component follows when submitting requests. As an example, a head tracker may submit requests at a rate anywhere from 10 requests per second ("RPS") to 60 RPS. It will be appreciated that a number of "requests" per second corresponds to a number of "frames" per second ("FPS") that the camera system will obtain. Thus, 10 "requests" per second corresponds to 10 "frames" per second.

A hand tracker may initially submit requests at a passive rate between 1 RPS and 5 RPS. This passive rate occurs during times when there are no detectable hands in the images. When a hand is detected, and/or hand tracking is initiated, the system will instantiate the hand tracker processes and dynamically adjust the frame request/capture rate to be between 20 RPS and 70 RPS.

Similarly, a depth detector may submit requests at a rate between 0.5 RPS and 5 RPS. As such, the arbiter 600B considers how often each image consuming component submits requests. If the arbiter 600B (1) determines that a second/subsequent request from a particular image consuming component will arrive shortly and (2) determines that other requests are much higher in priority, then the arbiter 600B may elect to drop the current request in favor of the other, higher priority requests. In some instances, this is an acceptable response because the arbiter 600B anticipates another request will be arriving shortly.

Another parameter is an assigned priority indication. For example, head tracking is often considered to be high in priority because the mixed-reality environment relies heavily on the position of the HMD. As such, the arbiter 600B may consider an already-determined priority indication, or the arbiter 600B may independently assign a priority indication based on which tracking operations are routinely considered to be highly important.

Yet another parameter is a subsequent impact that may occur if a particular request is not satisfied right away. As described above in the case of head tracking, the HMD may not provide a realistic mixed-reality environment if the head tracker is not reliably provided its images. Therefore, in this case, the subsequent determined impact may be a serious impairment to the mixed-reality environment. In a hand tracking case, the subsequent determined impact may result in a minor or inconsequential lag in monitoring the movement of a hand. In the case of depth detection, the subsequent determined impact may include a slight inaccuracy to the depths portrayed in the mixed-reality environment. These impacts may be included in each request or the arbiter 600B may independently determine them. Regardless, the arbiter 600B is able to compare and contrast each resulting impact and determine which impacts will be the most deleterious and thus should be avoided, if possible. In this regard, the system may prioritize one request from a first component over a request from a different component.

Although not shown, another parameter that may be considered is whether an image should be obtained with an IR light profile (i.e. a mask parameter). For instance, the request may indicate that the IR dot-pattern illuminator should emit IR light when the camera obtains an image. Additionally, or alternatively, the request may indicate that the flood IR illuminator should emit IR light when the camera obtains an image.

Yet another parameter is whether multiple requests can be processed simultaneously. For example, in some situations, the same digital image may be used to satisfy both a head tracker and a hand tracker request. This aspect will be discussed in more detail later in connection with FIG. 8.

Therefore, as discussed above, the arbiter 600B is able to consider any number of different parameters when establishing an execution order for a batch of requests. It will be appreciated that the arbiter 600B is able to give weight to these parameters and subsequently give preference to one or more particular requests such that those requests will be fulfilled before any of the other requests. Such a process is beneficial because it avoids the need for a rigid, overall scheduling mechanism.

Figure 7:
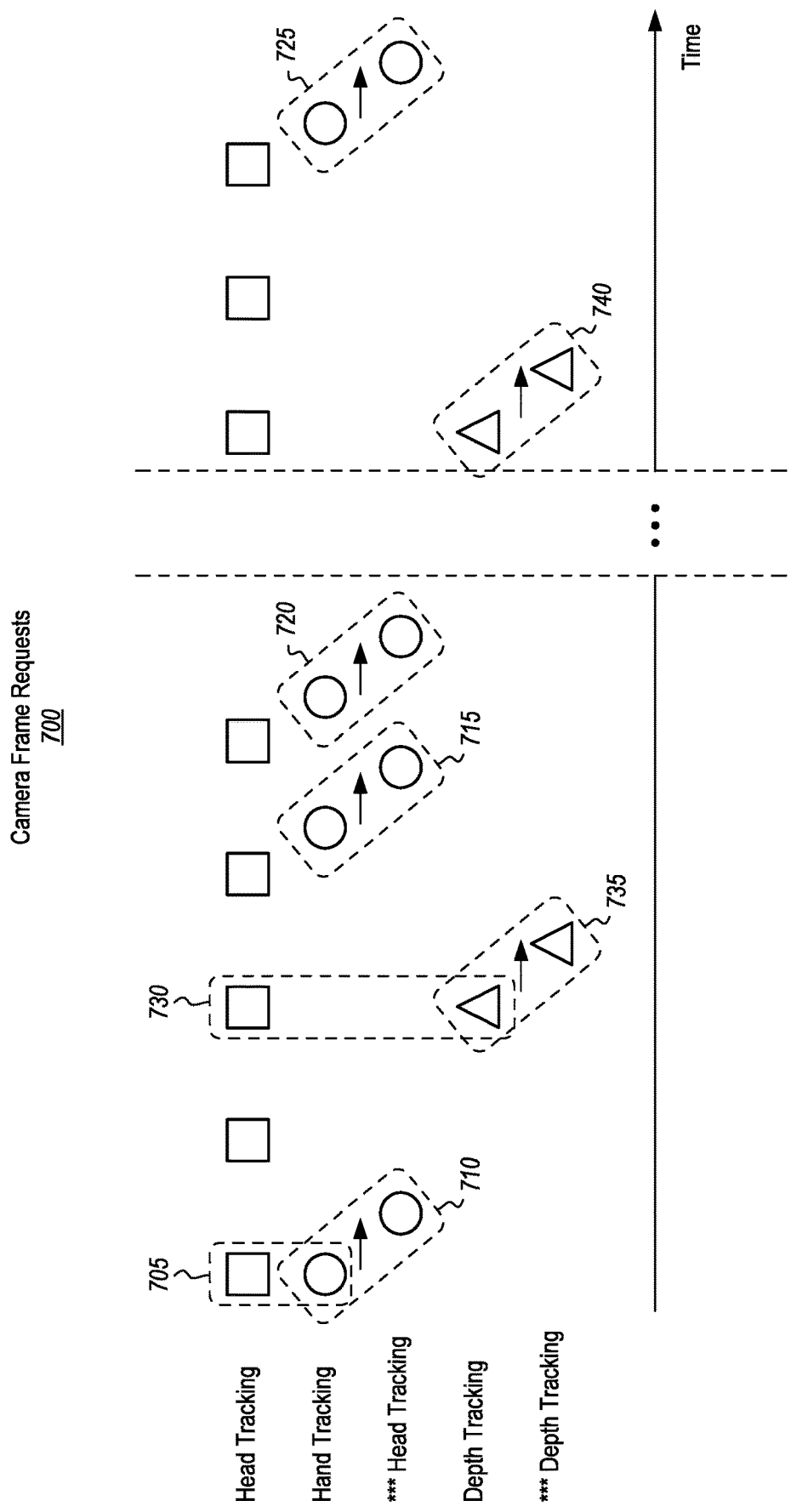
FIG. 7 shows a scenario where multiple image consuming components are each submitting camera frame requests according to their respective predetermined frequencies and where some of those requests interfere with one another.
Figure 8:
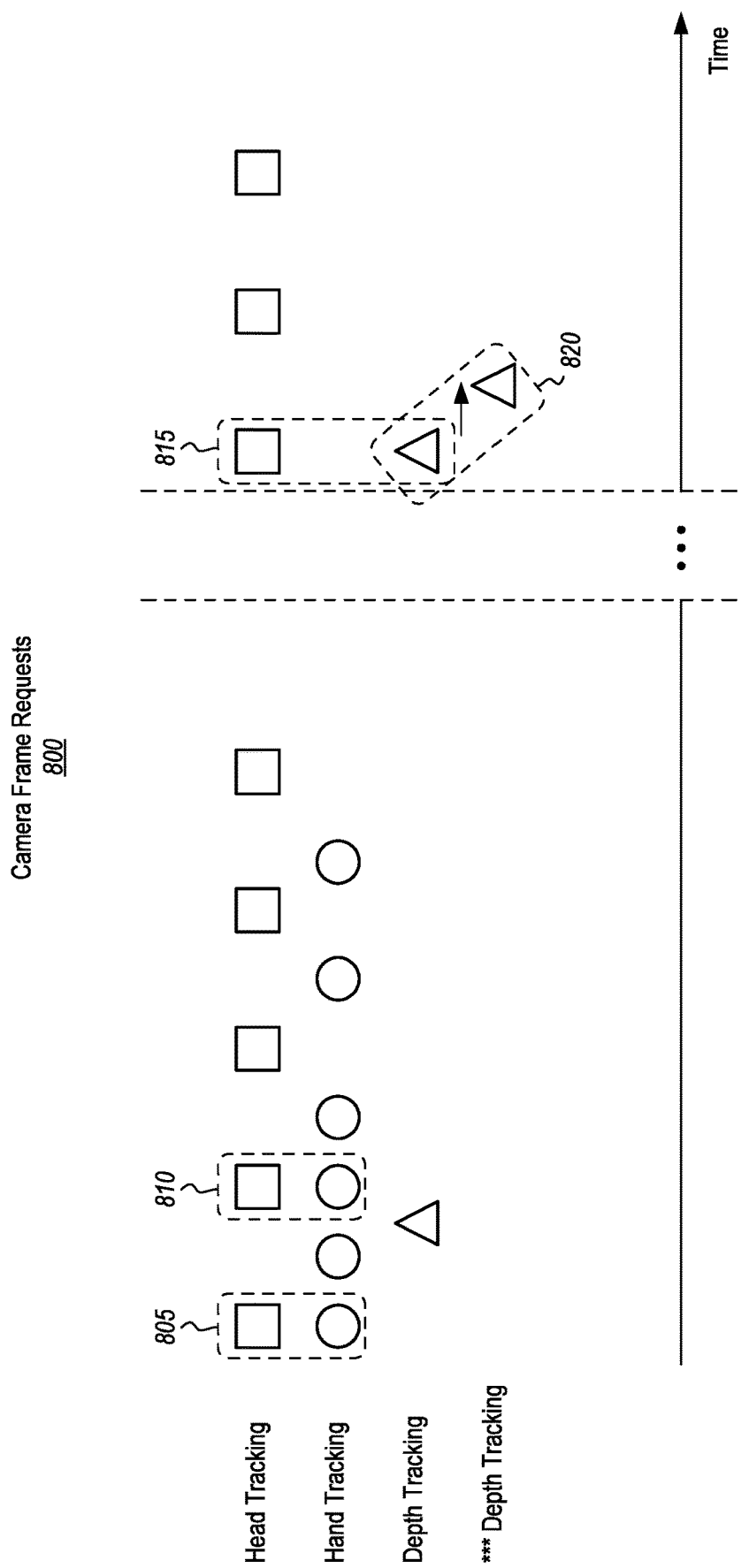
FIG. 8 is related to FIG. 7 but shows how some requests are processed simultaneously with each other.

Attention will now be directed to FIGS. 7 and 8. FIG. 7 shows an example scenario where the arbiter elected to prioritize some requests and delay other requests. FIG. 8 shows an example scenario where the arbiter elected to satisfy multiple requests simultaneously by providing the same digital image(s) to multiple different image consuming components.

Pre-Processing by Delaying and Phase Shifting

FIG. 7 shows a timeline where a number of different image consuming components are submitting requests 700 according to three different predetermined frequencies. As shown, these requests originate from a head tracker, a hand tracker, and a depth tracker. Although only three image consuming components are shown, more or less may be present. Similar to the earlier figures, the squares symbolically represent requests submitted by the head tracker, the circles symbolically represent requests submitted by the hand tracker, and the triangles symbolically represent requests submitted by the depth detector.

The batch of requests 705 illustrates an interference condition in which a head tracker request and a hand tracker request are received at the arbiter at substantially the same time (which was defined earlier). As such, both the head tracker request and the hand tracker request are simultaneously competing for the camera system's processing. After weighing the parameters discussed in connection with FIG. 6B, the arbiter (in this example scenario) determined that the head tracker's request has priority over the hand tracker's request such that the head tracker's request will be processed first. Consequently, the arbiter delayed processing the hand tracker's request until after the head tracker's request was fully satisfied. In some embodiments, the arbiter delays only a single request and does not issue a notification to the requesting image consuming component such that the image consuming component does not alter its pre-determined frequency.

In other embodiments, however, the arbiter does issue a notification to the requesting image consuming component, resulting in a "phase shift" to that entity's pre-determined frequency. In this manner, the arbiter instigates the adoption of a "phase shift." As used herein, a "phase shift" does not change the frequency at which requests are submitted. Instead, a phase shift simply adjusts in time when the requests will be submitted. As a result, the requests are now submitted at the same (but now laterally shifted in time) frequency. Such a scenario is shown in FIG. 7.

Even though the hand tracker's request was received at substantially the same time as the head tracker's request (as shown by the batch of requests 705), the hand tracker's request has now been delayed, as shown by the delay indication 710. Furthermore, a phase shift has been introduced into the hand tracker's frequency such that all subsequent requests from the hand tracker are also now laterally shifted in time, as shown by the phase shift indications 715, 720, and 725. The phase shift is based, at least in part, on how long the camera system takes to fully process the head tracker's request (e.g., the exposure time used to obtain the images corresponding to the head tracker's request).

FIG. 7 shows another collision condition in which multiple requests are received at substantially the same time, as shown by the batch of requests 730. Specifically, the depth detector's request and the head tracker's request were received together. Using the parameters described earlier, the arbiter decided that the head tracker's request has priority such that the depth detector's request is to be delayed, as shown by the delay indication 735. Furthermore, a phase shift has been introduced into the depth detector's frequency such that all subsequent requests from the depth detector are also now laterally shifted in time, as shown by the phase shift indication 740. Delaying and/or instigating a phase shift is just one example of how the arbiter is able to pre-process requests. Another method for pre-processing requests is shown in connection with FIG. 8.

Pre-Processing by Identifying Opportunities for Grouping

Similar to FIG. 7, FIG. 8 also shows a timeline where a number of different image consuming components are submitting requests 800 according to three different predetermined frequencies. Furthermore, and as shown by the batch of requests 805 and the batch of requests 810, some of the head tracker's requests are colliding/interfering with some of the hand tracker's requests.

Instead of delaying one, some, or all of the requests in the batches of requests 805 and 810, the arbiter (in this example scenario) determined that both the head tracker's request and the hand tracker's request may be fulfilled simultaneously with each other. "Fulfilled simultaneously" means that the same one or more camera frames may be used to satisfy more than one request.

The arbiter makes this determination by considering a request's type (e.g., is the request from the head tracker, or from the hand tracker, or from the depth detector, etc.) as well as by considering the parameters associated with each request in the batch. In some (but not necessarily all) situations, an image used to perform head tracking may also be used to perform hand tracking. Similarly, in some (but not necessarily all) situations, an image used to perform head tracking may be used to perform depth detection, and/or an image used to perform hand tracking may be used to perform depth detection.

In this example situation, the arbiter initially compared and contrasted the parameters and the types of both the head tracker's request and the hand tracker's request. Based on that comparison, the arbiter determined that the requests were sufficiently similar. Thereafter, the arbiter determined that both of those requests could be fulfilled simultaneously by providing the same one or more images to both the head tracker and the hand tracker.

FIG. 8 also shows a different batch of requests 815 which includes a request from the head tracker and a request from the depth detector. In contrast to processing both of these requests simultaneously, the arbiter determined that the requests were not sufficiently similar such that they are to be processed independently. Furthermore, the arbiter determined that the head tracker's request has priority over the depth detector's request. Therefore, the delay indication 820 illustrates that the depth detector's request has been delayed. Although not shown, some embodiments also instigate a phase shift to be added to the depth detector's frequency.

It will be appreciated that while the embodiments shown in FIGS. 7 and 8 illustrated only two requests competing at the same time, the arbiter is able to handle and resolve disputes for any number of competing/interfering requests (e.g., 3 requests, 4, 5, and so on). Furthermore, the arbiter is able to determine that any number of requests should be delayed and/or any number of requests should be fulfilled simultaneously.

Accordingly, the arbiter is able to respond to requests in a variety of different ways. In some instances, the arbiter will (1) deprioritize and laterally shift one or more requests (e.g., by adding a delay or even a phase shift), and/or (2) drop a request, and/or (3) simultaneously process multiple requests which overlap with one another and which have the least interference (e.g., their parameters and types are sufficiently similar).

In some embodiments, the arbiter may also pre-process requests (i.e. resolve conflicts) by sending different requests to different cameras in the camera system. In this manner, the arbiter interleaves the processing of requests with one another by causing different cameras to process different requests. In such implementations, the arbiter may elect to space out when these requests are performed by the different cameras if optical crosstalk from adjacent cameras could potentially interfere with the requests. Furthermore, if one request requires one type of IR illumination profile (e.g., an IR dot pattern) while another request requires a different illumination profile (e.g., a flood of IR light), then the arbiter may elect to alter the timing even further to prevent/avoid the introduction of undesired IR light into the resulting images. Additionally, some embodiments are configured to handle situations where multiple IR cameras are each interfering with one another. For example, suppose a HMD has multiple depth cameras. In some situations, these multiple cameras may interfere with one another. The embodiments are able to resolve these types of interfering conditions as well.

Adjusting Power Profiles

Oftentimes, the processing cores that are used to generate and/or consume the digital image data are put into a low power state between camera frames. For instance, when not actively obtaining image data, the camera system may be placed in a low power state. Additionally, or alternatively, each of the image consuming components (e.g., the head tracker, the hand tracker, and/or the depth detector) is placed in a low power state when not consuming and processing image data. Relatedly, if a processor, application specific integrated circuit ("ASIC"), graphics processing unit ("GPU"), or other hardware logic component is specially configured to operate as any one of the image consuming components, then that hardware logic component may also enter a low power state when not actively consuming or generating a camera frame. Even further, the IR dot-pattern illuminator(s) and/or the flood IR illuminator(s) and/or associated power supplies may also be put in a low power state when not emitting IR light for the camera system.

Figure 9:
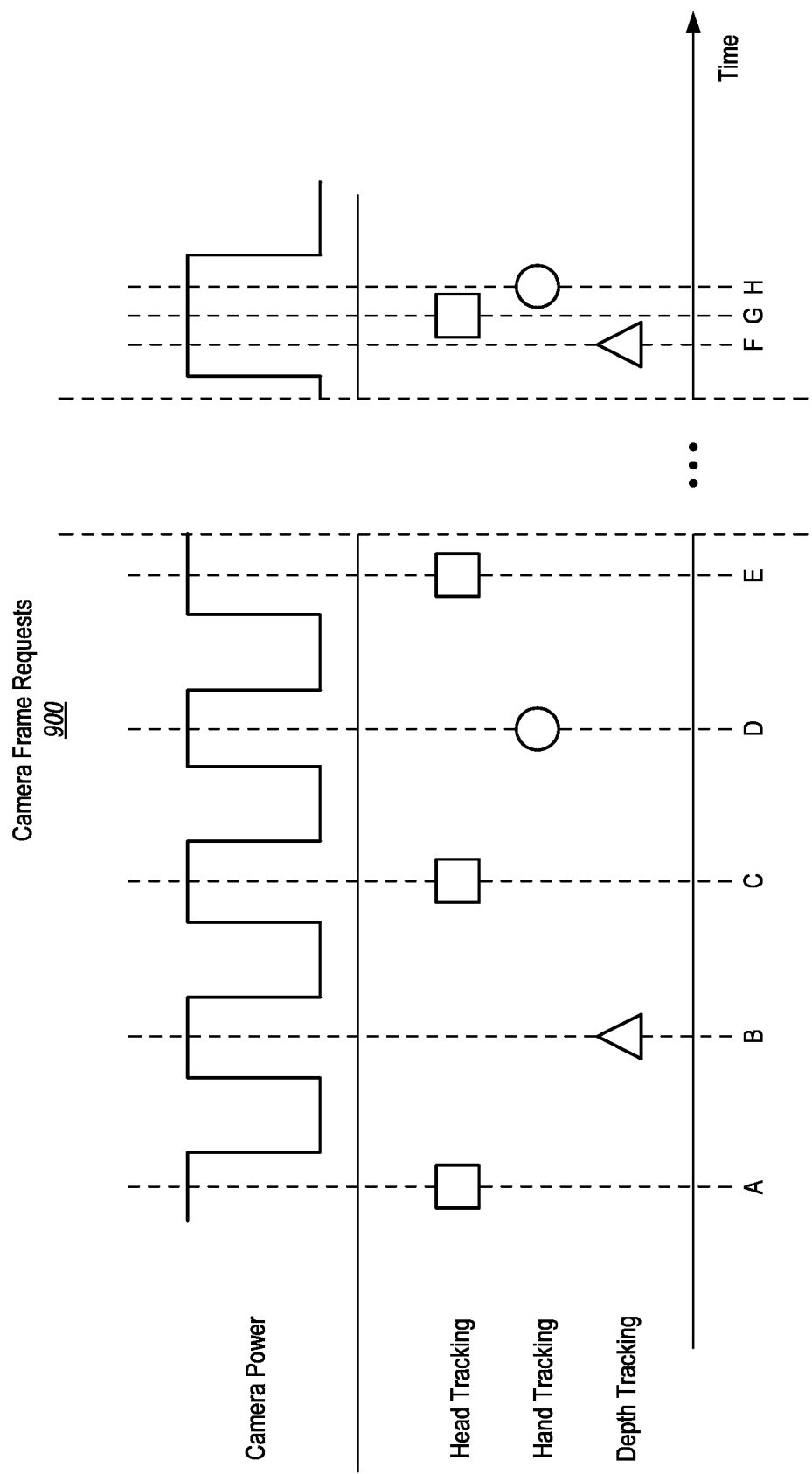
FIG. 9 shows how a camera system is controlled to alternate between a power state and a low power state in order to conserve or otherwise reduce power consumption.

Therefore, in addition to pre-processing requests, the arbiter may have a duty of looking ahead (e.g., in the range of 2 to 5 camera frame periods) when interacting with each image consuming component and/or the camera system to ensure that those components are put into an active state a sufficient time before a request needs to be processed. To further clarify, because there is often a finite time required to wake up these resources (e.g., the image consuming components, the camera system, IR light emitters, etc.), the arbiter interacts with these resources to ensure that they are awake a sufficient time before they need to be active. Such functionality is shown in FIG. 9 with regard to the power profile of the camera system. Although only the camera system's power profile is illustrated, the principles apply equally to the power profiles of each of the image consuming components, the hardware logic components, the IR light emitters, and so on.

Accordingly, attention will now be directed to FIG. 9 which shows the camera system's power profile for a set of requests 900. As shown, the camera system is powered down during periods of inactivity and then powered up as needed. Such operations beneficially reduce the camera system's power consumption, thus increasing the HMD's battery lifespan.

To illustrate, at time "A," the camera system processes a request for the head tracker by obtaining one or more digital images/camera frames of the surrounding environment. At time "B," the camera system processes a request for the depth detector. At times "C," "D," and "E," the camera system processes requests for the head tracker, the hand tracker, and again the head tracker, respectively. During these times in which requests are processed, the camera system (and perhaps also the corresponding image consuming component, the hardware logic components, the IR light emitters, etc.) is powered on and operating to obtain images. When the camera system is not processing requests, then it can be powered down to a low power state.

Although times periods A, B, C, D, and E showed instances where the camera system's power cycled up and down, the time periods F, G, and H show that the camera system's power may stay on to process multiple successive requests that are received within a threshold time of each other. In such a scenario, the camera system stays powered on to quickly handle each request.

As described, the HMD may also pulse the image consuming components, the hardware logic components, the IR light emitters (e.g., the IR dot-pattern illuminator(s) and/or the flood IR illuminator(s)), and so on to synchronize with the camera system's pulsing. Such operations also significantly reduce how much power is consumed. Furthermore, some embodiments modify the intensities of the IR light emitters to provide more or less IR light for the camera system to sense.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
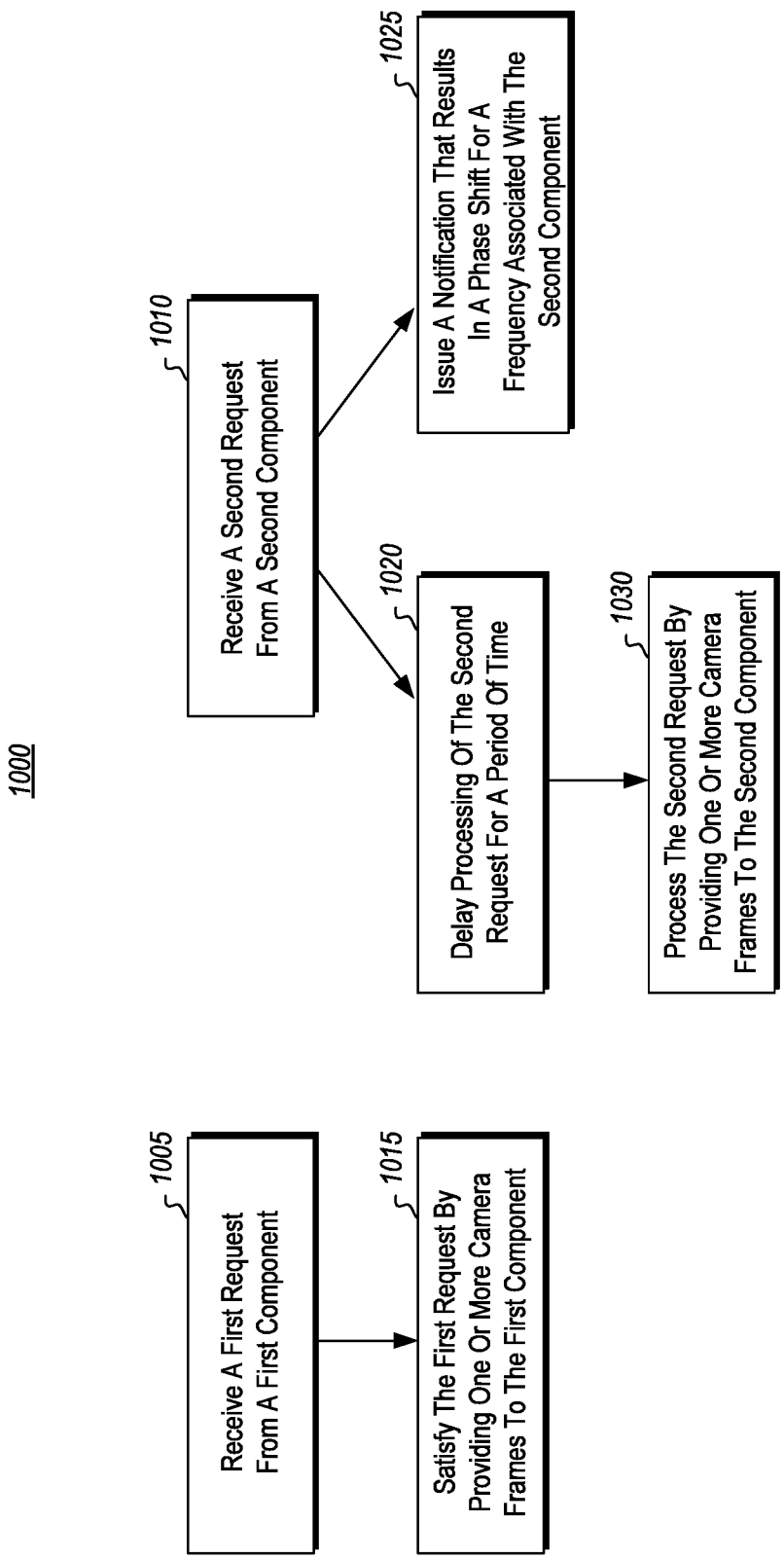
FIG. 10 illustrates a flowchart of an example method for performing asynchronous camera frame allocation where the processing of certain camera frame requests is delayed.

FIG. 10 shows an example flowchart 1000 of a method for performing asynchronous camera frame allocation in which requests are received from multiple image consuming components that compete for use of one or more shared cameras to obtain one or more digital images of a surrounding environment of a computer system (e.g., the HMD 300 from FIG. 3), which implements the method. The first two illustrated acts (acts 1005 and 1010) are shown as occurring side-by-side to indicate that there is no temporal dependency on these two acts.

During act 1005, a first request is received from a first image consuming component that submits requests at a first predetermined frequency (e.g., any of the frequencies that were discussed earlier). This request may be received by an arbiter (e.g., the arbiter 505 from FIG. 5). As shown by act 1015, the first request is subsequently satisfied by the one or more cameras providing one or more camera frames, which correspond to the first request, to the first image consuming component.

Either simultaneously with the receipt of the first request or before the first request is fully satisfied, a second request is received (act 1010) from a second image consuming component that submits requests at a second predetermined frequency (e.g., using the frequencies that were discussed earlier). Again, the arbiter may receive this second request.

As shown by act 1020, the arbiter is able to delay processing (e.g., delay image capture) of the second request for a period of time. This delay may be prolonged until the cameras fully satisfy the first request, as discussed above in connection with act 1015. In addition to performing this delay, the arbiter also issues a notification to the second image consuming component, as shown by act 1025. Issuing the notification results in a phase shift of the second image consuming component's predetermined frequency. In some implementations, this phase shift is at least partially based on the period of time that the second request was delayed.

The final act 1030 shows that the second request is processed after the first request is processed. Similar to how the first request was processed, the second request is also processed by the one or more shared cameras providing one or more camera frames, which correspond to the second request, to the second image consuming component. Accordingly, the flowchart 1000 generally aligns with the depiction of events shown in FIG. 7. Furthermore, such processes improve how camera processing is allocated by dynamically shifting when one or more subsequent requests will be submitted while enabling the subsequent requests to be submitted in accordance with their respective request frequencies.

Figure 11:
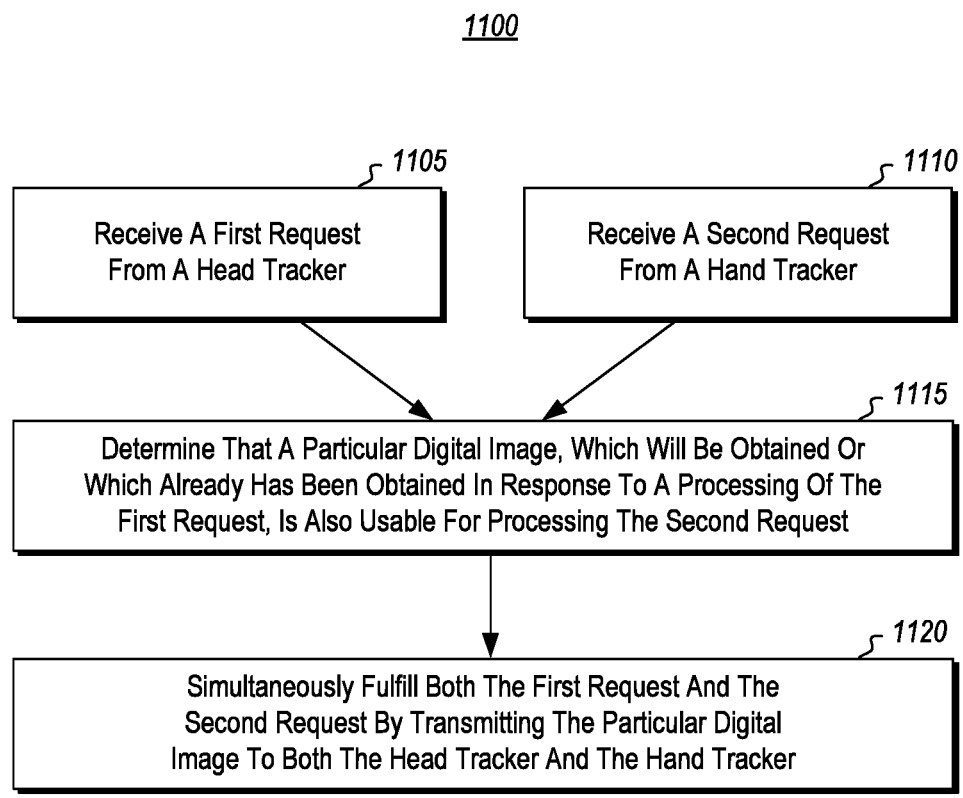
FIG. 11 illustrates a flowchart of an example method for performing asynchronous camera frame allocation where certain camera frame requests are fulfilled simultaneously with each other by providing the same digital image to multiple requesting entities.

While the flow chart 1000 of FIG. 10 showed an example method for imposing a phase shift, the flow chart 1100 of FIG. 11 shows an example method that is related to FIG. 8. In particular, the method performs asynchronous camera frame allocation in which requests are received from multiple image consuming components which include a head tracker and a hand tracker and which compete for use of one or more shared cameras to obtain one or more digital images of a surrounding environment of a computer system that executes this method.

The first two acts 1105 and 1110 are shown side-by-side to demonstrate that there is no temporal dependency between the two. As shown, a first digital image request is received from a head tracker which submits digital image requests at a first predetermined frequency (act 1105). Similarly, a second digital image request is received from the hand tracker which submits digital image requests at a second predetermined frequency (act 1110). In some circumstances, the first and second digital image requests are received at substantially the same time (e.g., before the camera has begun processing either one) while in other circumstances the second request is received before the camera has fully processed the first request (or vice versa).

The method also includes an act 1115 of determining that a particular digital image, which will be obtained or which already has been obtained in response to a processing of the first digital image request, is also usable for processing the second digital image request. To clarify, during certain circumstances (as described earlier in this disclosure), an image that was received in response to a digital image request from a head tracker may also be used for a hand tracker or perhaps even a depth detector. As a result, the arbiter may elect to process multiple requests at the same time by providing the same one or more digital images to the requesting entities.

In this manner, both the first digital image request and the second digital image request are simultaneously fulfilled by transmitting the particular digital image to both the head tracker and the hand tracker (act 1120).

It will be appreciated that the foregoing embodiments can be implemented to help improve the manner in which camera image requests are processed, particularly for systems that include multiple components and by dynamically identifying when to process the digital image requests received from the multiple components, including conflicting requests, for shared camera resources.

Example Computer System

Figure 12:
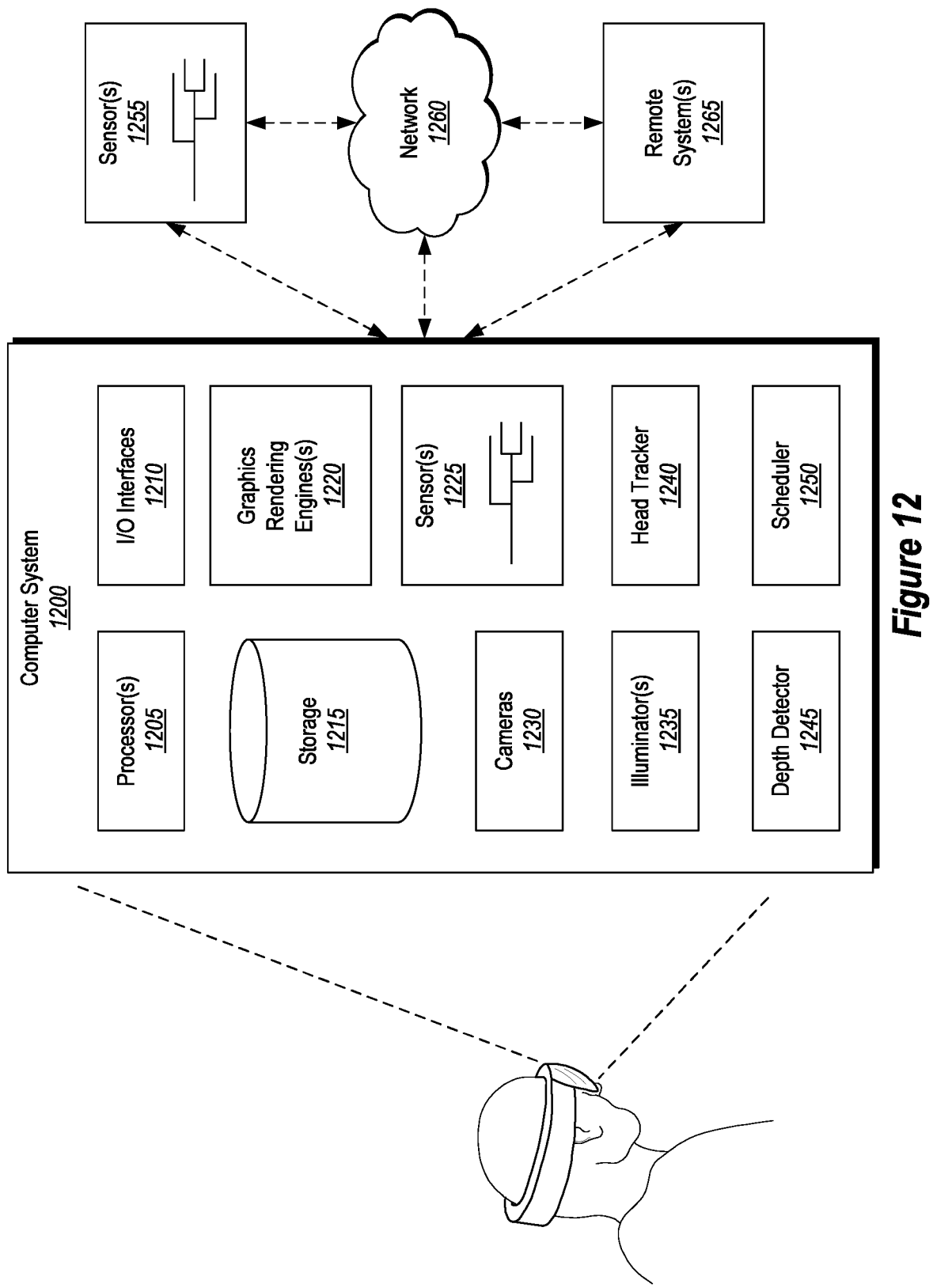
FIG. 12 illustrates an example computer system that may be used to facilitate the disclosed operations.

Having just described the various features and functionalities of some of the disclosed embodiments, the focus will now be directed to FIG. 12 which illustrates an example computer system 1200 that may be used to facilitate the operations described herein. In particular, this computer system 1200 may be in the form of the HMDs that were described earlier.

In fact, the computer system 1200 may take various different forms. For example, in FIG. 12, the computer system 1200 is embodied as a HMD. Although the computer system 1200 may be embodied as a HMD, the computer system 1200 may also be a distributed system that includes one or more connected computing components/devices that are in communication with the HMD. Accordingly, the computer system 1200 may be embodied in any form and is not limited strictly to the depiction illustrated in FIG. 12. By way of example, the computer system 1200 may include a desktop computer, a laptop, a tablet, a mobile phone, server, data center and/or any other computer system.

In its most basic configuration, the computer system 1200 includes various different components. For example, FIG. 12 shows that computer system 1200 includes at least one hardware processing unit 1205 (aka a "processor"), input/output (I/O) interfaces 1210, storage 1215, graphics rendering engines 1220, and one or more sensors 1225. Computer system 1200 also include cameras 1230, illuminator(s) 1235 (e.g., one or more IR dot-pattern illuminators and/or one or more flood IR illuminators), a head tracker 1240, a depth detector 1245, and a scheduler 1250 (e.g., the arbiter 505 from FIG. 5).

The storage 1215 may be physical system memory, which may be volatile, non-volatile, or some combination of the two. The term "memory" may also be used herein to refer to non-volatile mass storage such as physical storage media. If the computer system 1200 is distributed, the processing, memory, and/or storage capability may be distributed as well. As used herein, the term "executable module," "executable component," or even "component" can refer to software objects, routines, or methods that may be executed on the computer system 1200. The different components, modules, engines, and services described herein may be implemented as objects or processors that execute on the computer system 1200 (e.g. as separate threads).

The disclosed embodiments may comprise or utilize a special-purpose or general-purpose computer including computer hardware, such as, for example, one or more processors (such the hardware processing unit 1205) and system memory (such as storage 1215), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1200 may also be connected (via a wired or wireless connection) to external sensors 1255 (e.g., one or more remote cameras, accelerometers, gyroscopes, acoustic sensors, magnetometers, etc.). Further, the computer system 1200 may also be connected through one or more wired or wireless networks 1260 to remote systems(s) 1265 that are configured to perform any of the processing described with regard to computer system 1200.

During use, a user of the computer system 1200 is able to perceive information (e.g., a mixed-reality environment) through a display screen that is included among the I/O interface(s) 1210 and that is visible to the user. The I/O interface(s) 1210 and sensors 1225/1255 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 1220 is configured, with the hardware processing unit 1205, to render one or more virtual objects within the scene. As a result, the virtual objects accurately move in response to a movement of the user and/or in response to user input as the user interacts within the virtual scene.

A "network," like the network 1260 shown in FIG. 12, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1200 will include one or more communication channels that are used to communicate with the network 1260. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 1205). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to perform a method of asynchronous camera frame allocation in which camera frame requests are received from multiple image consuming components that compete for use of one or more shared cameras to obtain one or more digital images of a surrounding environment of the computer system, wherein the method includes the computer system:
   receiving a first camera frame request from a first image consuming component that submits camera frame requests at a first predetermined frequency;
   receiving a second camera frame request from a second image consuming component that submits camera frame requests at a second predetermined frequency, wherein the second camera frame request is received before the first camera frame request is fully processed;
   delaying image capture for the second camera frame request for a period of time during which at least the first camera frame request is satisfied by the one or more shared cameras providing one or more camera frames corresponding to the first camera frame request to the first image consuming component;
   issuing a notification to the second image consuming component that results in a phase shift of the second predetermined frequency by the second image consuming component, the phase shift being based at least partially on the period of time; and
   processing the second camera frame request after the first camera frame request is processed and in which the one or more shared cameras provide one or more camera frames corresponding to the second camera frame request to the second image consuming component.

2. The computer system of claim 1, wherein any one or more of the following are caused to enter a low power state when not actively consuming or generating a camera frame: (1) the one or more shared cameras, or (2) the first image consuming component, or (3) the second image consuming component.

3. The computer system of claim 1, wherein the first image consuming component is a head tracker that determines a pose estimation for the computer system, which is a head-mounted device (HMD), the second image consuming component is a depth detector that determines depth from active or passive stereo images, and wherein a third image consuming component submits a third camera frame request, the third image consuming component is a hand tracker that tracks a position of a user's hand.

4. The computer system of claim 1, wherein the first predetermined frequency is at least 10 frames per second and wherein the second predetermined frequency is at least 1 frame per second.

5. The computer system of claim 1, wherein the period of time at least corresponds to an exposure time of the one or more shared cameras.

6. The computer system of claim 1, wherein, when the one or more shared cameras are in a low power state, an infrared (IR) dot-pattern illuminator and/or a flood IR illuminator is also placed in a low power state.

7. The computer system of claim 1, wherein the second camera frame request is received at substantially a same time as the first camera frame request is received.

8. The computer system of claim 7, wherein the method further includes determining that the second camera frame request is to be delayed as opposed to the first camera frame request and the determining being based on the following condition: an assigned priority associated with both the first camera frame request and the second camera frame request.

9. The computer system of claim 7, wherein the method further includes determining that the second camera frame request is to be delayed as opposed to the first camera frame request and the determining being based on a frame rate requirement associated with both the first camera frame request and the second camera frame request.

10. A method for performing asynchronous camera frame allocation in which camera frame requests are received from multiple image consuming components that compete for use of one or more shared cameras to obtain one or more digital images of a surrounding environment of a computer system that implements the method, wherein the method includes:
   receiving a first camera frame request from a first image consuming component that submits camera frame requests at a first predetermined frequency;
   receiving a second camera frame request from a second image consuming component that submits camera frame requests at a second predetermined frequency, wherein the second camera frame request is received before the first camera frame request is fully processed;
   delaying processing of the second camera frame request for a period of time during which at least the first camera frame request is satisfied by the one or more shared cameras providing one or more camera frames corresponding to the first camera frame request to the first image consuming component;
   issuing a notification to the second image consuming component that results in a phase shift of the second predetermined frequency by the second image consuming component, the phase shift being based at least partially on the period of time; and
   processing the second camera frame request after the first camera frame request is processed and in which the one or more shared cameras provide one or more camera frames corresponding to the second camera frame request to the second image consuming component.

11. The method of claim 10, wherein the first camera frame request includes a request that the one or more shared cameras use a variable exposure time when obtaining the one or more camera frames corresponding to the first camera frame request.

12. The method of claim 11, wherein the second camera frame request includes a request that the one or more shared cameras use a different variable exposure time when obtaining the one or more camera frames corresponding to the second camera frame request.

13. The method of claim 10, wherein the computer system is a mixed reality head-mounted device.

14. The method of claim 10, wherein the first image consuming component is a head tracker that determines a pose estimation for the computer system, which is a head-mounted device (HMD), the second image consuming component is a depth detector that determines depth from active or passive stereo images, and wherein a third image consuming component submits a third camera frame request, the third image consuming component is a hand tracker that tracks a position of a user's hand.

15. The method of claim 10, wherein the method further includes receiving a third camera frame request from a third image consuming component that submits camera frame requests at a third predetermined frequency, and wherein a third image consuming component is a hand tracker.

16. A computer system comprising:
   one or more processors; and
   one or more computer-readable hardware storage devices having stored thereon computer-executable instructions that are executable by the one or more processors to cause the computer system to perform a method of asynchronous camera frame allocation in which camera frame requests are received from multiple image consuming components which include a head tracker and a hand tracker and which compete for use of one or more shared cameras to obtain one or more digital images of a surrounding environment of the computer system, wherein the method includes the computer system:
      receiving a first digital image request from the head tracker which submits digital image requests at a first predetermined frequency;
      receiving a second digital image request from the hand tracker which submits digital image requests at a second predetermined frequency, wherein the second digital image request is received before the first digital image request is fully processed;
      determining that a particular digital image, which will be obtained or which already has been obtained in response to a processing of the first digital image request, is also usable for processing the second digital image request; and
      simultaneously fulfilling both the first digital image request and the second digital image request by transmitting the particular digital image to both the head tracker and the hand tracker,
      whereby the computer system improves how camera processing is allocated by dynamically identifying when a same digital image is usable to process multiple digital image requests which are received from multiple different image consuming components.

17. The computer system of claim 16, wherein the first digital image request from the head tracker is received at substantially a same time as the second digital image request from the hand tracker.

18. The computer system of claim 16, wherein the method further includes receiving a third digital image request from a depth detector.

19. The computer system of claim 18, wherein the method further includes:
   determining that the third digital image request cannot be fulfilled simultaneously with the first digital image request and the second digital image request; and
   delaying a processing of the third digital image request until at least the first digital image request is fully processed.

20. The computer system of claim 18, wherein the method further includes:
   determining that the third digital image request can be fulfilled simultaneously with the first digital image request and the second digital image request; and
   fulfilling the third digital image request by transmitting the particular digital image to the depth detector.

* * * * *